(12) United States Patent
Van Bosch (10) Patent No.: US 7,418,276 B2
(45) Date of Patent: *Aug. 26, 2008

(54) ACTIVATION SYSTEM AND METHOD FOR ESTABLISHING A CELLULAR VOICE COMMUNICATION THROUGH A RADIO SYSTEM

(75) Inventor: James A. Van Bosch, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/180,620

(22) Filed: Jun. 26, 2002

(65) Prior Publication Data

US 2004/0204159 A1 Oct. 14, 2004

(51) Int. Cl.
*H04M 1/00* (2006.01)
(52) U.S. Cl. .............................. 455/569.1; 455/569.2
(58) Field of Classification Search .......... 455/569.1–2, 455/575.9, 93, 522, 420, 456.1, 433, 414, 455/417, 406–408, 426, 455, 569.2; 340/825.41, 340/870, 693.2, 468, 5.1, 435, 539.18, 573.1, 340/425
See application file for complete search history.

(56) References Cited

U.S. PATENT DOCUMENTS

| | | | |
|---|---|---|---|
| 4,897,644 A | 1/1990 | Hirano | |
| 5,294,915 A | 3/1994 | Owen | |
| 5,406,171 A | 4/1995 | Moody | |
| 5,754,645 A | 5/1998 | Metroka et al. | |
| 5,832,390 A * | 11/1998 | Irvin | 455/569.2 |
| 5,867,794 A * | 2/1999 | Hayes et al. | 455/557 |

(Continued)

OTHER PUBLICATIONS

Marketing Unlimited (webpage): http://www.marketumltd.com/cellphone-adapter.html. 2001.

(Continued)

*Primary Examiner*—Melody Mehrpour
(74) *Attorney, Agent, or Firm*—Thomas V. Miller; Terri S. Hughes; Valerie M. Davis (57) ABSTRACT

An activation system (20, 120, 220) for establishing a voice communication through a radio system (22, 122, 222) in a vehicle. The radio system (22, 122, 222) has an audio controller and a device interface. The activation system (20, 120, 220) has a switch (28, 128, 228), a wireless communication device (26, 226), and a communication cord (36, 136, 236). The switch (28, 128, 228) is capable of initiating an activation signal when a user desires to accept an incoming voice communication. The wireless communication device (26, 226) has a controller (62, 262), a cellular transceiver (66, 266), a radio interface (38, 238), and a means for detecting the activation signal form the switch (28, 128, 228). The cellular transceiver (66, 266) is capable of receiving downlink audio of the voice communication. A communication cord (36, 136, 236) interconnects the radio system (22, 122, 222) to the wireless communication device (26, 226). The switch (28, 128, 228) is remote from the wireless communication device (26, 226). The controller (62, 262) in the wireless communication device (26, 226), in response to detecting the activation signal from the switch (28, 128, 228), sends the downlink audio of the voice communication received by the cellular transceiver (66, 266) to the radio interface (38, 238) for sending to the radio system (22, 122, 222) over the communication cord. There are also methods of operating the activation system (20, 120, 220).

20 Claims, 7 Drawing Sheets

U.S. PATENT DOCUMENTS

| | | | |
|---|---|---|---|
| 6,034,593 | A | 3/2000 | Chase et al. |
| 6,134,456 | A * | 10/2000 | Chen .................... 455/569.2 |
| 6,169,492 | B1 | 1/2001 | Dabbish |
| 6,351,653 | B1 | 2/2002 | Alberth, Jr. et al. |
| 6,393,301 | B1 * | 5/2002 | Oda ........................ 455/557 |
| 6,397,086 | B1 * | 5/2002 | Chen .................... 455/569.2 |
| 6,484,040 | B1 * | 11/2002 | Wang .................... 455/569.2 |
| 6,718,187 | B1 * | 4/2004 | Takagi et al. ............ 455/569.2 |
| 6,721,541 | B1 * | 4/2004 | Kingsley ................ 455/67.11 |
| 2003/0104842 | A1 * | 6/2003 | Choi et al. ................ 455/569 |
| 2003/0109290 | A1 * | 6/2003 | Moffi et al. ................ 455/569 |
| 2003/0119566 | A1 * | 6/2003 | Chen ........................ 455/569 |
| 2004/0192404 | A1 * | 9/2004 | Zenios et al. ............ 455/569.1 |
| 2004/0203351 | A1 * | 10/2004 | Shearer et al. ............ 455/41.1 |

OTHER PUBLICATIONS

Direct Sales Inc. (webpage): http://shop.store.yahoo.com/direct/audunhanfref.html. 2001.

Webpage: http://www.expomed.com/consumer/safety/cellphonef.htm. 2001.

Cellular-Battery.com (webpage): http://cellular-battery.com/info/FM_hands_free.htm. 2001.

Webpage: http://store5.yimg.com/l/cell-accessories_1660-7822870. 2001.

* cited by examiner

ACTIVATION SYSTEM AND METHOD FOR ESTABLISHING A CELLULAR VOICE COMMUNICATION THROUGH A RADIO SYSTEM

CROSS-REFERENCE TO RELATED APPLICATION

This application is related to the following co-pending and commonly assigned patent application, which is hereby incorporated by reference herein: application Ser. No. 10/180,576, entitled "ACTIVATION SYSTEM AND METHOD FOR ESTABLISHING A CELLULAR VOICE COMMUNICATION THROUGH A RADIO SYSTEM," filed on same date herewith, by Marion Zenios and James A. Van Bosch

FIELD OF THE INVENTION

This invention in general relates to hands-free cellular communication systems and, more particularly, to an activation system and method for establishing a voice communication through a vehicle radio system that reduces the number of distractions to a vehicle operator.

BACKGROUND OF THE INVENTION

Today, many people use portable phones in their vehicles. For safety reasons, the industry is focused on providing hands-free features to people who use portable phones in their vehicle. Some portable phones allow the audio output of the phone to be routed to the radio system in the vehicle. One known way to route the audio output of the phone to the radio system is through a wireless connection, such as a frequency modulated (FM) signal. There, the portable phone has an FM transmitter that transmits the audio output of the portable phone to the vehicle's radio system. The vehicle's radio system allows the audio output to be played through the vehicle's audio speakers when the radio system is tuned to a predetermined radio frequency.

Conventional systems, however, require at least a two-step process for answering an incoming cellular phone call. First, the user must tune the radio in the vehicle to a compatible radio frequency. Second, the user must answer the call via the cell phone's user interface. Although it is possible for a user of some phones to set the portable phone to automatically answer incoming calls and transmit the audio output automatically through a FM transmitter to the vehicle's radio system, the situation is not ideal since the user may not be ready to receive the phone call and the radio system may not yet be tuned to a compatible radio frequency to hear the audio output.

There is a need to reduce the number of steps in answering an incoming cellular phone call in the vehicle. Reducing the number of steps allows the user of the vehicle to focus on their primary role—driving the vehicle. Additionally, there is a need for improving the way a voice communication is established in a hands-free cellular communication system that reduces the number of distractions to the user.

It is, therefore, desirable to provide an improved hands-free cellular communication system and method to overcome or minimize most, if not all, of the preceding problems.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is an activation system and method for establishing a voice communication through a radio system that reduces the number of distractions to the vehicle operator. The system and method reduces the complexity and the number of distractions when answering or establishing a cellular communication.

To this end, in one embodiment there is an activation system for establishing a voice communication through a radio system in a vehicle. The radio system has an audio controller and a device interface. The activation system has a switch, a wireless communication device, and a communication cord. The switch is capable of initiating an activation signal when a user desires to accept an incoming voice communication. The wireless communication device has a controller, a cellular transceiver, a radio interface, and a means for detecting the activation signal from the switch. The cellular transceiver is capable of receiving downlink audio of the voice communication. A communication cord interconnects the device interface of the radio system to the radio interface of the wireless communication device. The switch is remote from the wireless communication device. The controller in the wireless communication device, in response to detecting the activation signal from the switch, sends the downlink audio of the voice communication received by the cellular transceiver to the radio interface for sending to the radio system over the communication cord.

The audio controller may also receive an activation signal from the switch. The audio controller, in response to receiving the activation signal from the switch, is capable of sending the downlink audio of the voice communication from the device interface to at least one speaker in the radio system. The radio system may further include a microphone that receives uplink audio of the voice communication. The audio controller may further, in response to receiving the activation signal from the switch, be capable of sending the uplink audio of the voice communication to the device interface so that it may be then sent to the wireless communication device over the interconnecting communication cord.

In a further embodiment, there is an activation system for establishing a voice communication through a radio system in a vehicle. The activation system has a remote activation device and a wireless communication device. The remote activation device has a switch and a transmitter. The transmitter is responsive to the switch and capable of transmitting an activation signal. The wireless communication device has a controller, a radio transceiver, a cellular transceiver, and a radio interface. The controller is capable of detecting the activation signal from the remote activation device through the radio transceiver. The cellular transceiver is used for receiving the downlink audio of the voice communication. In response to detecting the activation signal from the remote activation device, the controller in the wireless communication device sends the downlink audio of the voice communication received by the cellular transceiver to the radio interface for transmittal to the radio system in the vehicle.

The remote activation device may be further configured to send a second signal to the radio system. The radio system may have a device interface and an audio controller. The device interface is capable of receiving the downlink audio of the voice communication. The audio controller is capable of detecting the second signal and routing the downlink audio of the voice communication from the device interface to at least one speaker in the vehicle in response to detecting the second signal.

In another embodiment, there is a remote activation device for establishing a voice communication for a wireless communication device through a radio system. The wireless communication device has a controller, a radio transceiver, a cellular transceiver, and a radio interface. The remote activation device includes a transmitter and a switch. The transmitter in the remote activation device is capable of transmitting a signal to the controller in the wireless communication device through the radio transceiver. The switch is used to activate the transmitter in the remote activation device. The signal transmitted by the remote activation device is capable of causing the wireless communication device to accept an incoming voice communication and route the voice communication to the radio interface for transmittal to the radio system in the vehicle.

A further embodiment is a remote activation device for establishing a voice communication for a wireless communication device through a radio system that has a switch and a transmitter. The transmitter is responsive to the switch and used to transmit a first signal and a second signal. The first signal indicates to the wireless communication device to accept an incoming voice communication. The second signal indicates to the radio system to switch an audio input to receive downlink audio of the voice communication sent by the wireless communication device.

There is also a method to activate a downlink audio of a voice communication through a radio system in a vehicle. The method includes the steps of: notifying the user of a pending incoming voice communication to a wireless communication device; transmitting a first signal from a remote activation device to the wireless communication device if the pending incoming voice communication is accepted; detecting the first signal in the wireless communication device from the remote activation device; and sending the downlink audio of the voice communication from the wireless communication device to the radio system through a communication cord after detecting the first signal from the remote activation device. The method may further include the steps of: transmitting a second signal from the remote activation device to the radio system if the pending incoming voice communication is accepted; detecting the second signal in the radio system from the remote activation device; and switching an audio input to receive the downlink audio of the voice communication from the wireless communication device in response to detecting the second signal.

There is also a method to activate a downlink audio of a voice communication through a radio system in a vehicle having the following steps: notifying the user of a pending incoming voice communication to a wireless communication device; determining whether the pending incoming voice communication should be accepted by waiting a predetermined time period for a signal from a remote activation device; if the pending incoming voice communication is not accepted, then transferring the downlink audio of the voice communication to an electronic voice answering service; and if the pending incoming voice communication is accepted, then sending the downlink audio of the voice communication to a radio interface in the wireless communication device and sending the downlink audio of the voice communication to the radio system through the radio interface. The method may further include the steps of: determining in the wireless communication device whether the voice communication should be terminated by waiting for a second signal from the remote activation device; and terminating the voice communication when the wireless communication device receives the second signal from the remote activation device.

In another embodiment, the activation system is used for establishing a voice communication through a radio system in a vehicle where the radio system has an audio controller, a user interface, and a device interface. The activation system includes a switch, a wireless communication device, and a removable communication cord. The switch is connected to the audio controller of the radio system. The audio controller of the radio system, responsive to the switch, is capable of sending an activation signal to the device interface of the radio system. The wireless communication device has a controller, a cellular transceiver, and a radio interface. The cellular transceiver is used for receiving downlink audio of the voice communication. The removable communication cord interconnects the device interface of the radio system to the radio interface of the wireless communication device. The controller of the wireless communication device is capable of detecting the activation signal from the radio system through the removable communication cord. The controller in the wireless communication device, in response to detecting the activation signal from the radio system, sends the downlink audio of the voice communication received by the cellular transceiver to the radio interface for transmittal to the radio system over the removable communication cord.

Figure 1:
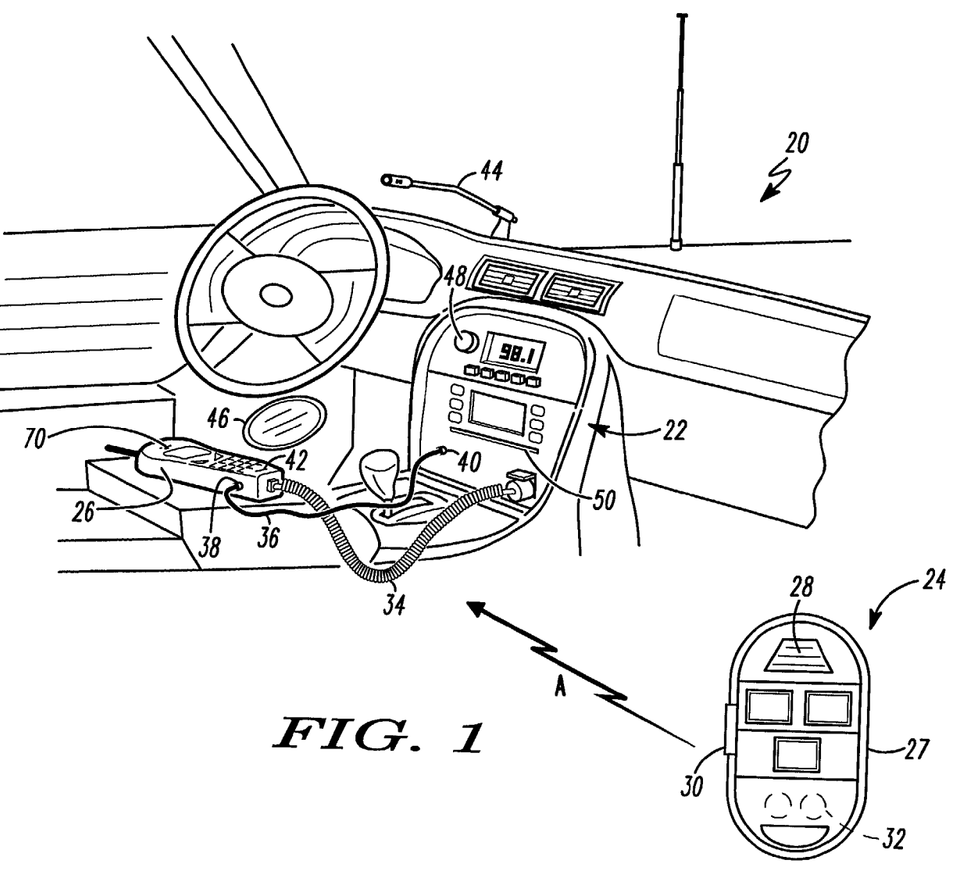
FIG. 1 is a perspective view of an activation system according to one embodiment of the present invention in a vehicle.

Now, turning to the drawings, FIG. 1 illustrates one embodiment of an activation system 20 for establishing a voice communication through a radio system 22 in a vehicle. In general, the activation system 20 includes a remote activation device 24 and a wireless communication device 26.

In one embodiment, the remote activation device 24 may be a separate portable electronic device or integrated into another portable electronic device such as a wireless remote for the vehicle's radio system. The remote activation device 24 has an outer housing 27, a switch 28, a transmitter 30, and a power supply 32. The housing 27 of the remote activation device 24 may be used to house the switch 28, the transmitter 30, and the power supply 32. The power supply 32 may be a lithium battery that provides power to the transmitter 30 when the vehicle operator activates the switch 28.

The operator of the vehicle may activate the switch 28 when the operator desires to accept a pending incoming cellular voice communication or to place an outgoing cellular voice communication. As will be explained in more detail below, the transmitter 30 is responsive to the switch 28 and is capable of transmitting an activation signal A to the wireless communication device 26 when the operator of the vehicle presses the switch 28. In one embodiment, the activation signal A is a radio frequency signal such as an FM (frequency modulation) signal.

The wireless communication device 26 is preferably a cellular phone that is capable of receiving cellular voice communications. The wireless communication device 26 may be powered by an internal battery or through a DC power cord 34 that is connected to an outlet on the vehicle. As will be explained further below, the wireless communication device 26 is also configured to detect and receive the activation signal A transmitted by the remote activation device 24. In response to detecting and receiving the activation signal A transmitted by the remote activation device 24, the wireless communication device 26 will send the downlink audio of the cellular voice communication to a communication cord 36 via a radio interface 38. The communication cord 36 has a connector that plugs into the radio interface 38 and another connector that plugs into a device interface 40 in the radio system 22. The communication cord 36 interconnects the wireless communication device 26 to the radio system 22. In one embodiment, the radio interface 38 and device interface 40 are standard 2.5 mm jacks that are typically known for headsets.

The wireless communication device 26 may also be configured to receive uplink audio of the cellular voice communication from a microphone. The microphone may be an internal microphone 42 in the wireless communication device 26 or may be a separate external microphone 44 in the vehicle that is wired to the wireless communication device 26 or through the vehicle radio system 22.

The radio system 22 is configured to receive at least downlink audio of the voice communication over communication cord 36 and through device interface 40. As will be explained in more detail below, the radio system 22 has an audio controller that is capable of switching, transferring, or otherwise routing the downlink audio of the voice communication to speakers 46 in the vehicle. The radio system 22 may further have a radio tuner 48, a CD player 50, and other peripheral input devices that are muted when a voice communication is activated over the radio system 22. Through the use of an external microphone 44, the radio system 22 may also be configured to send uplink audio of the voice communication through device interface 40 and over communication cord 36.

Figure 2:
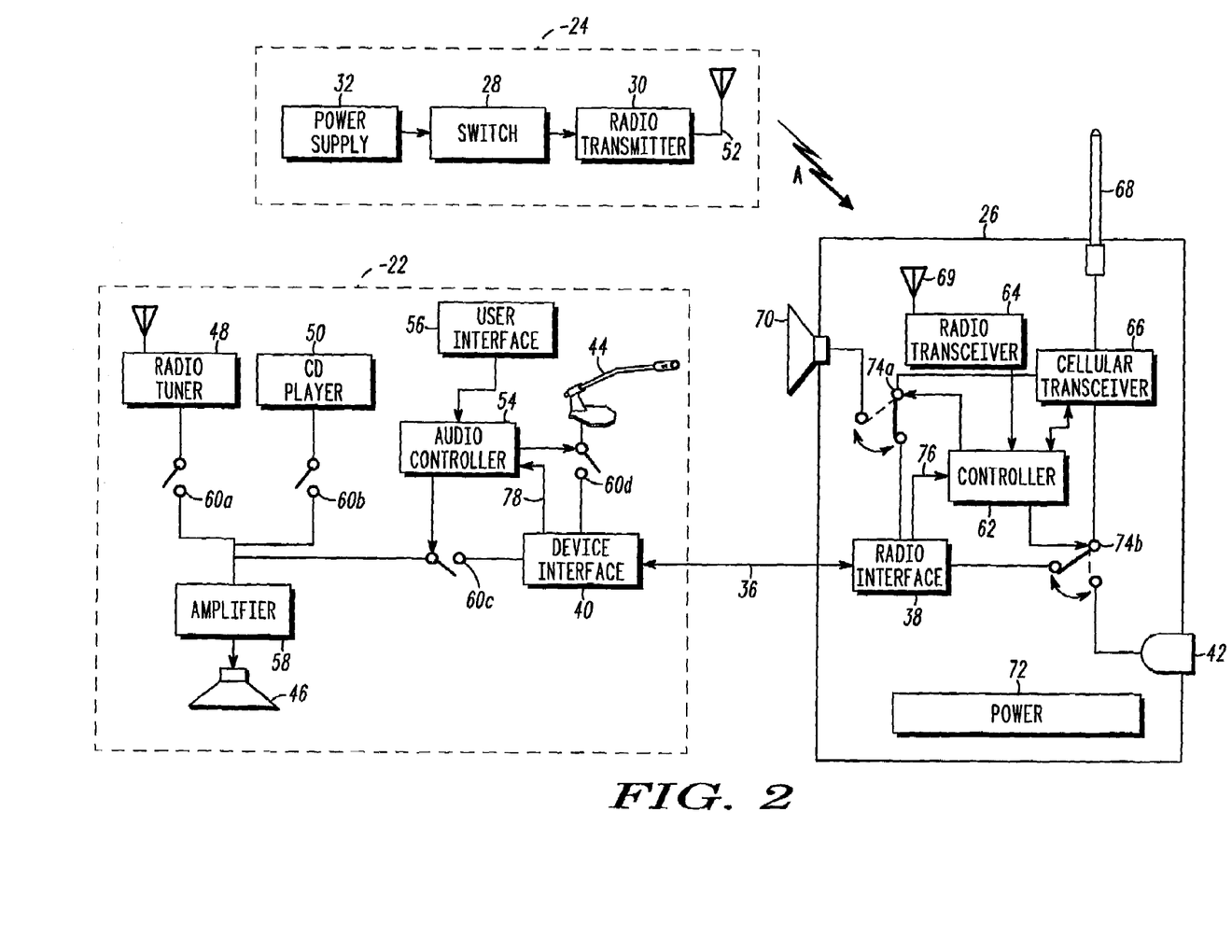
FIG. 2 is a block diagram of a remote activation device, a wireless communication device, and a radio system according to one embodiment of the present invention.

The interaction between the vehicle radio system 22, the remote activation device 24, and the wireless communication device 26 will now be explained in the context of FIG. 2. FIG. 2 illustrates a remote activation device 24 having a switch 28, a transmitter 30, and a power supply 32. The transmitter 30 is responsive to the switch 28 and is capable of transmitting an activation signal A to the wireless communication device 26 when the operator of the vehicle presses the switch 28. As explained earlier, in one embodiment, this activation signal A may be an FM signal. This transmission may be done through an antenna 52 that is internal to the remote activation device 24.

The radio system 22 may generally include an audio controller 54, a user interface 56, a radio tuner 48, a CD player 50, a device interface 40, and at least one audio speaker 46. The radio system 22 may further include other items such as an external microphone 44 or other peripheral devices such as a cassette player or video output. The radio system 22 may also include other circuitry such as an amplifier 58 and a plurality of switches 60a-d to interconnect the components. The switches 60a-d are preferably controlled by the audio controller 54.

In one embodiment, the wireless communication device 26 is a cellular phone capable of detecting and receiving cellular voice communications and includes a controller 62, a radio transceiver 64, a cellular transceiver 66, a radio interface 38, an antennas 68, 69, an internal microphone 42, a speaker 70, and a power supply 72. The wireless communication device 26 may further include other circuitry such as a plurality of switches 74a, 74b for interconnecting the components within the wireless communication device 26. The switches 74a, 74b may be controlled by the controller 62. The wireless communication device 26 receives downlink audio cellular voice communications and transmits uplink audio cellular voice communications via the cellular transceiver 66 and antenna 68.

The controller 62 is configured according to known methods to monitor the cellular transceiver 66 for pending incoming cellular voice communications. Upon receiving a pending voice communication, the controller 62 will notify the operator of a pending voice communication via an audio or other alert. The controller 62 will then determine whether the vehicle operator will agree to accept the voice communication. In one embodiment, the controller 62 may make this determination by waiting for a predetermined time period to detect whether the remote activation device 24 transmitted an activation signal A. The controller 62 may receive activation signals A through the antenna 69 and the radio transceiver 64. If the pending incoming voice communication is not accepted, then the controller 62 can do nothing and let the voice communication transfer to an electronic voice answering service. Alternatively, the controller 62 can respond to the voice communication by sending a special message to the incoming caller that the operator of the vehicle is not able to respond to the call at this time.

If the controller 62 determines that the pending incoming voice communication is accepted (an activation signal A has been detected or received), then the controller 62 may switch, transfer or otherwise route the downlink audio of the voice communication from the cellular transceiver 66 to the radio interface 38 so that it can be sent to the radio system 22 over the communication cord 36. In one embodiment, this can be done by the controller 62 through control of a switch 74a that is capable of connecting the cellular transceiver 66 to the radio interface 38. Preferably, the controller 62 has the capability of detecting the presence of a connector of the communication cord 36 in the radio interface 38 through connection link 76. When the controller 62 detects the presence of a connector, and after receiving the activation signal A, the controller 62 may then switch, transfer, or otherwise route the downlink audio of the voice communication to the radio interface 38 and over communication cord 36. During normal phone operations (without going through the radio system 22), the controller 62 may direct that the switch 74a connect the cellular transceiver 66 to the internal speaker 70.

For the uplink audio of the voice communication to be transmitted by the cellular transceiver 66, several options exist. In one embodiment, the controller 62 senses the presence of a connector of the communication cord 36 in the radio interface 38 through link 76. When the controller 62 detects the presence of the communication cord 36, and after receiving the activation signal A, the controller 62 may then switch, transfer, or otherwise route the uplink audio of the voice communication from the radio interface 38 to the cellular transceiver 66. In one embodiment, this can be done by the controller 62 through control of a switch 74b that is capable of connecting the radio interface 38 to the cellular transceiver 66. Alternatively, the controller 62 may control the switch 74b so that the cellular transceiver 66 receives uplink audio of the voice communication from the internal microphone 42.

For outgoing communications, the vehicle operator may initiate a cellular voice communication by pressing the switch 28 on the remote activation device 24. As described above, this will do two things. First, the transmitter 30 in the activation device 24 will transmit an activation signal A to the wireless communication device 26. Since no pending calls are being received, the controller 62 will then activate the telephone so that the vehicle operator may dial a number through the keypad on the wireless communication device 26. If the wireless communication device 26 is configured to accept voice recognition commands, the phone number may be dialed through known voice recognition methods. This can be done by having the vehicle operator speak into the device's internal microphone 42 or an externally wired microphone 44 in the vehicle. Second, the controller 62 in the wireless communication device 26 will switch, transfer, or otherwise route the downlink audio of the voice communication to the radio interface 38 so that the downlink audio may be sent to the radio system 22 over communication cord 36. This should enable the radio system 22 to receive the downlink audio of the voice communication from the wireless communication device 26. The audio controller 54 of the radio system 22 may be configured to detect the presence of the downlink audio being transmitted by the wireless communication device 26. The audio controller 54 may then switch, transfer, or otherwise route the downlink audio from the device interface 40, over communication cord 36, to the audio speakers 46 in the vehicle.

Two components of the radio system 22 are the device interface 40 and the audio controller 54. The device interface 40 is capable of receiving the downlink audio of the voice communication through the communication cord 36. The audio controller 54 is capable of switching, transferring, or otherwise routing the downlink audio of the voice communication from communication cord 36 to the vehicle audio speakers 46. In one embodiment, the audio controller 54 may do this by control of switch 60c. The audio controller 54 may also be configured to switch off other inputs to the speakers 46 (such as the radio tuner 48 and the CD player 50) by controlling switches 60a and 60b. In one embodiment, the audio controller 54 routes the downlink audio to the audio speakers 46 in response to sensing the presence of a connector of the communication cord 36 plugged into the device interface 40. Monitoring communication link 78 can do this. In another embodiment, the audio controller 54 routes the downlink audio to the audio speakers 46 in response to sensing the presence of the downlink audio over communication cord 36 by monitoring communication link 78. In a further embodiment, the audio controller 54 may route the downlink audio to the audio speakers 46 when it receives an input from a switch on the user interface 56.

The audio controller 54 may also be configured to control the input of an external microphone 44 that may be used for uplink audio of the voice communication. In one embodiment, the radio system 22 has a switch 60d that is controlled by the audio controller 54. The audio controller 54 may be configured to connect the external microphone 44 to the device interface 40 after detecting the presence of a connector of the communication cord 36 that is plugged into the device interface 40. This enables uplink audio to be transferred from the external microphone 44 over communication cord 36 and to the wireless communication device 26. The external microphone 44 may also be hard-wired directly to the device interface 40 without a switch.

As one of ordinary skill in the art will appreciate, the present invention reduces the number of steps in answering and placing voice communications. With a single push of a button, the wireless communication device 26 is instructed to transmit or otherwise route the downlink audio of the voice communication to the radio system 22 and the radio system 22 is configured to play the downlink audio over the vehicle audio speakers. The vehicle operator may then hear the received downlink audio of the voice communication over the audio speakers 46 in the vehicle.

The internal microphone 42 in the wireless communication device 26 may then be used for the uplink audio of the voice communication. Alternatively, an external wired microphone 44 may be used for receiving the uplink audio for the voice communication.

The vehicle operator may also use the remote activation device 24 to terminate a voice communication. During the voice communication, the controller 62 in the wireless communication device 26 may be configured to wait for or detect a second signal from the remote activation device 24. The second signal may also be an FM signal. When the controller 62 detects or receives the second signal from the remote activation device 24, the controller 62 may terminate the voice communication. This, again, further reduces the number of steps typically known in terminating a hands-free voice communication.

Figure 3:
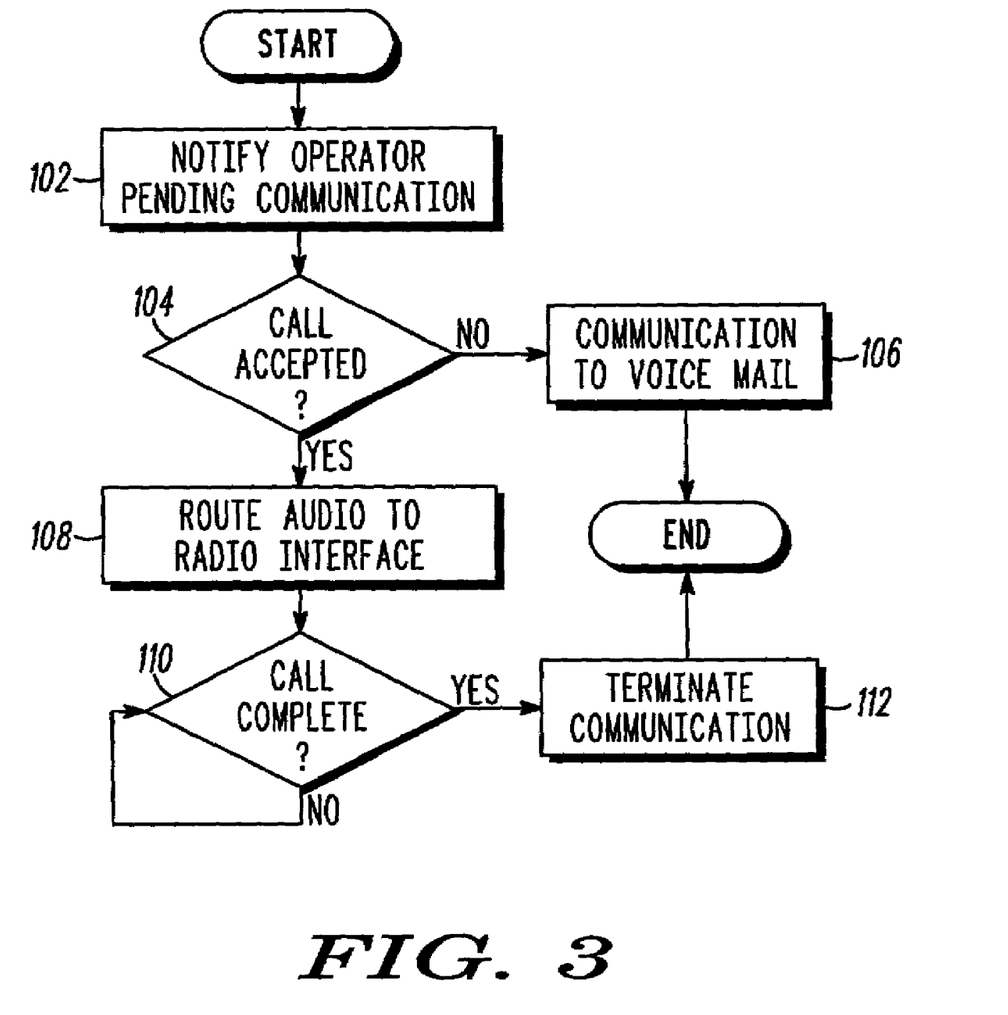
FIG. 3 is a flow diagram of a method according to one embodiment of the present invention.

In one embodiment, the controller 62 has a processor that implements software stored in memory. FIG. 3 illustrates one method that may be implemented in software for accepting a voice communication in the wireless communication device 26. The method begins at process block 102 where the wireless communication device 26 receives a pending incoming cellular voice communication. Upon receiving a pending voice communication, the controller 62 notifies the operator of the vehicle that an incoming call is being attempted. The notification may be an audio or visual alert through the wireless communication device 26.

The process then proceeds to decision block 104 where a determination is made whether the pending incoming voice communication should be accepted. This may be done by having the controller 62 wait for or detect during a predetermined time period for a signal A from the remote activation device 24. As shown in block 106, if the pending incoming voice communication is not accepted, then the communication may be directed to an electronic voice mail or answering service. Otherwise, as shown in block 108, if the pending incoming voice communication is accepted, then the downlink audio of the voice communication is switched, transferred or otherwise routed to the radio interface 38. This allows the downlink audio of the voice communication to be transmitted to the radio system 22 over communication cord 36 so that the vehicle operator may hear it over the vehicle speakers 46. The wireless communication device 26 may then receive the uplink audio for the voice communication through an internal microphone 42 or an externally wired microphone 44.

The process then proceeds to decision block 110 where a determination is made whether the existing voice communication is complete. This may be done by having the controller 62 wait for or detect a second signal A to be transmitted by remote activation device 24. Alternatively, the vehicle operator could terminate the call through the keypad of the wireless communication device 26. The process stays at decision block 110 until the controller 62 makes a determination that the call is complete. At that point, as shown in block 112, the controller 62 then terminates the call and the process ends.

Figure 4:
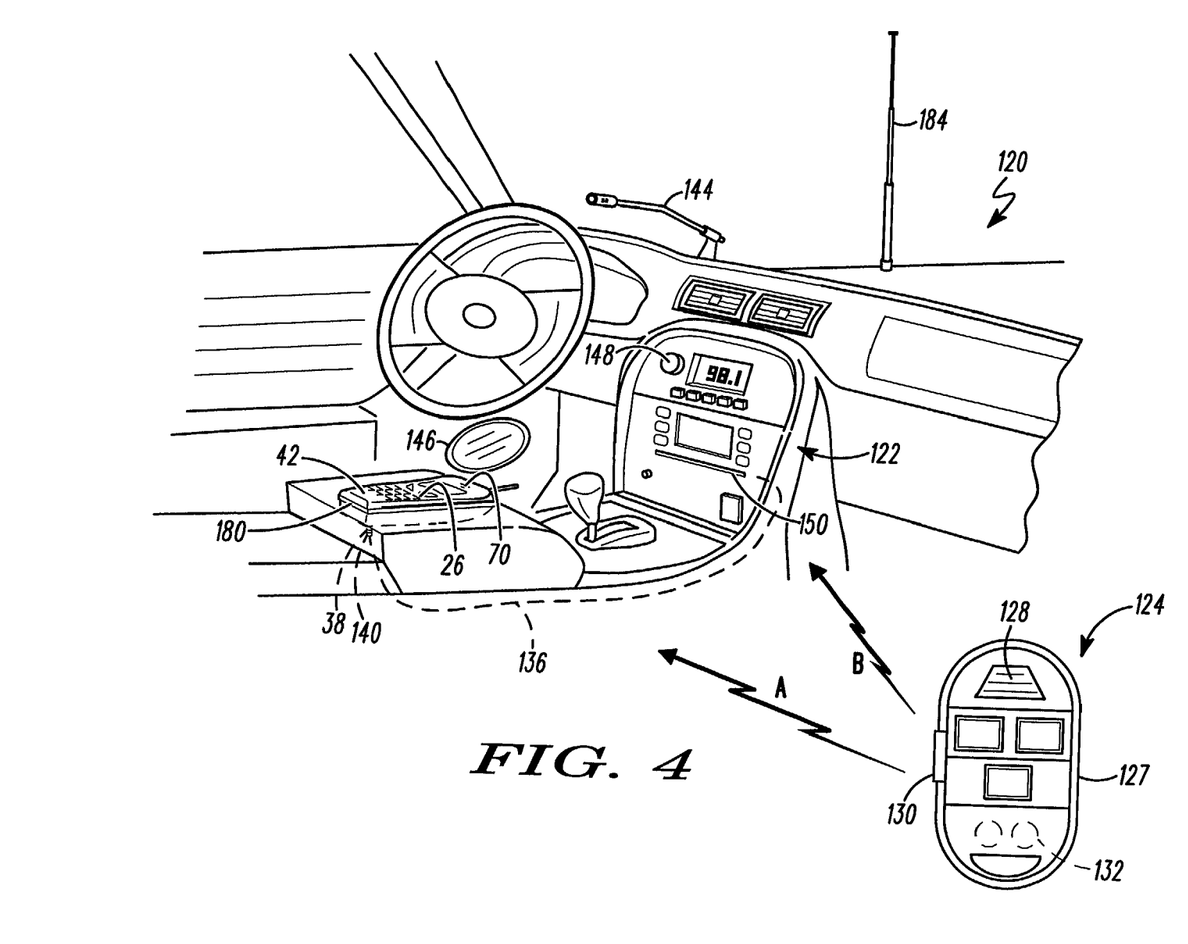
FIG. 4 is a perspective view of another embodiment of an activation system according to the present invention.
Figure 5:
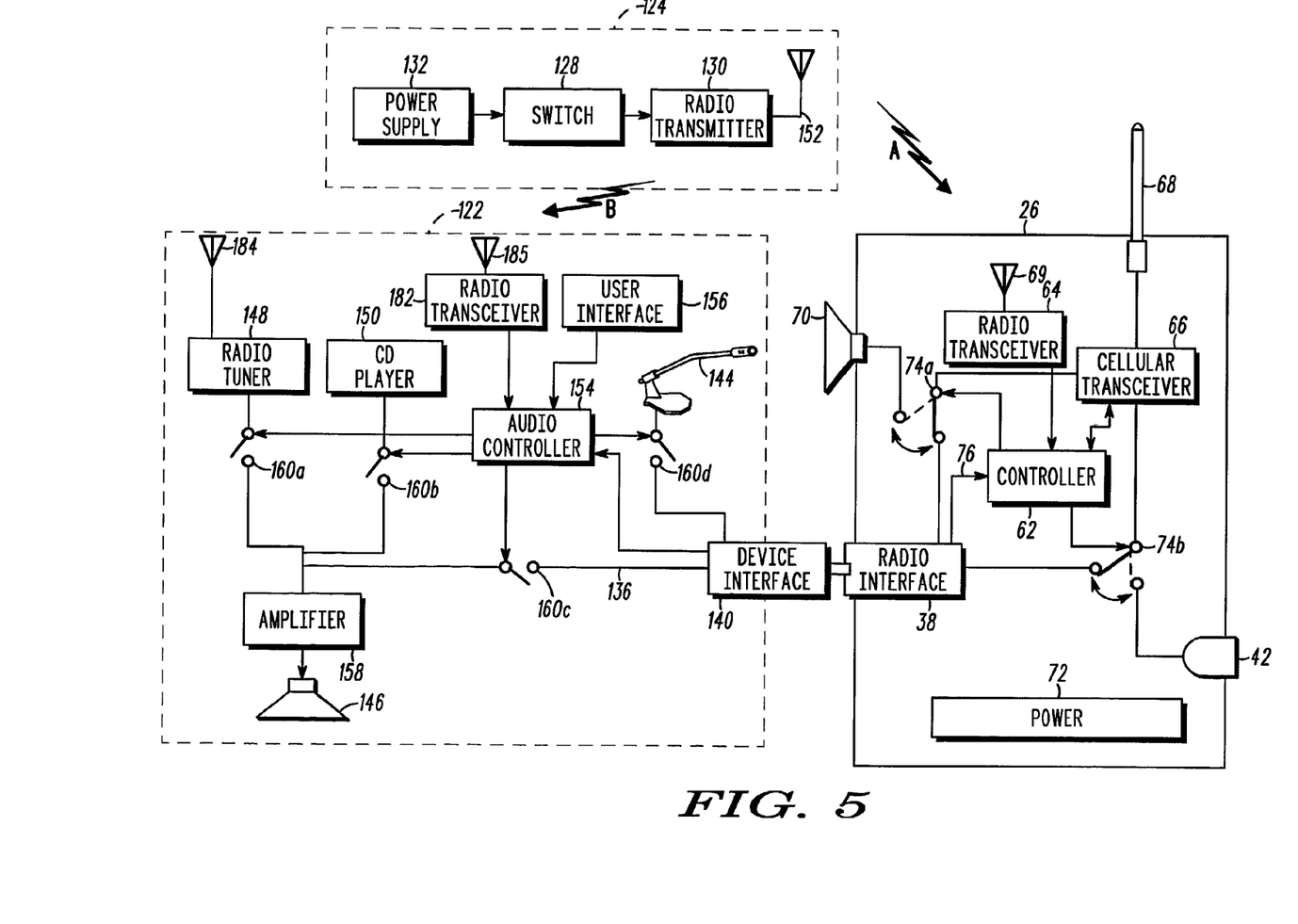
FIG. 5 is a block diagram of another embodiment of a remote activation device, a wireless communication device, and a radio system according to the present invention.

FIGS. 4 and 5 illustrate another embodiment of a remote activation system 120. Referring initially to FIG. 4, a remote activation device 124 is used in the activation system 120 for establishing a voice communication through a radio system 122 in a vehicle. In general, the activation system 120 here includes a remote activation device 124 and a wireless communication device 26.

Similar to the embodiment shown in FIG. 1, the remote activation device 124 has an outer housing 127, an activation switch 128, a transmitter 130, and a power supply 132. The housing 127 of the remote activation device 124 may be used to house the activation switch 128, the transmitter 130, and the power supply 132 as well as any other functions or components that may be used by the device. The power supply 132 may be a lithium battery that provides power to the transmitter 130 when the vehicle operator activates the switch 128. Here, however, the transmitter 130 is configured to transmit a first signal A and a second signal B as will be explained in more detail below.

The operator of the vehicle may activate the switch 128 when the operator desires to accept a pending incoming cellular voice communication or to place an outgoing cellular voice communication. The transmitter 130 is responsive to the switch 128 and is capable of transmitting a first signal A (or activation signal) to the wireless communication device 26. In one embodiment, the activation signal A is a radio frequency signal such as an FM signal. This first signal A indicates to the wireless communication device to accept an incoming voice communication or set up an outgoing voice communication. The transmitter 130 is also capable of transmitting a second signal B to the radio system 122. The second signal B may also be an FM signal. This second signal B indicates to the radio system 122 to switch, transfer, or otherwise route the downlink audio of the voice communication to the audio speakers 146 of the radio system 122. The radio system 122 may also mute the other input sources to the radio system 122 such as the radio tuner 148 or the CD player 150. Thus, at the same time the transmitter 130 is transmitting the activation signal A to the wireless communication device 26, the radio system 122 is being directed to switch its audio input to receive the downlink audio from the wireless communication device 26.

As explained above, the wireless communication device 26 is preferably a cellular phone that is capable of receiving cellular voice communications. The wireless communication device 26 may be powered by an internal battery or through a DC power cord that is connected to an outlet on the vehicle. In the embodiment shown in FIG. 4, the wireless communication device 26 is capable of being attached to the radio system 122 by a receiving cradle 180 in the vehicle. The receiving cradle 180 provides external power to the wireless communication device 180 and provides an interface to the radio system 122. Similar to the embodiment described in FIGS. 1 and 2, the wireless communication device 26 is also configured to detect and receive the first (or activation) signal A transmitted by the remote activation device 124. In response to detecting and receiving the first signal A transmitted by the remote activation device 24, the wireless communication device 26 will switch, transfer, or otherwise route the downlink audio of the cellular voice communications to its radio interface 138 so that it may be transmitted over a vehicle communication cord 136 in the radio system 122. The uplink audio for the cellular voice communication may be received by the wireless communication device 26 through an internal microphone 42 in the device or a separate external microphone 144 wired to the device.

The radio system 122 is configured to receive at least the downlink audio of the voice communication through an internal device interface 140 and over the vehicle communication cord 136. As will be explained in more detail below, the radio system 122 has an audio controller that is capable of switching, transferring, or otherwise routing the downlink audio of the voice communication to speakers 146 in the vehicle. In one embodiment, the radio system 122 performs this function in response to receiving the second signal B transmitted by the remote activation device 124. The radio system may be configured to receive the second signal B through an antenna 185. Through the use of an external microphone 144, the radio system 122 may also be configured to send uplink audio of the voice communication over communication cord 136 and through the device interface 140.

The interaction between the vehicle radio system 122, the remote activation device 124, and the wireless communication device 26 will now be explained in the context of FIG. 5. FIG. 5 illustrates a remote activation device 124 having a switch 128, a transmitter 130, and a power supply 130. The transmitter 130 is responsive to the switch 128 and is capable of transmitting a first signal A to the wireless communication device 26 when the operator of the vehicle presses the switch 128. This transmission may be done through an antenna 152 that is internal to the remote activation device 124 and may be an FM signal.

As shown in FIG. 5, the remote activation device 124 also transmits a second signal B to the radio system 122. The radio system 122 generally includes an audio controller 154, a user interface 156, a radio tuner 148, a CD player 150, a device interface 140, at least one audio speaker 146, a radio transceiver 182, and antennas 184, 185. The radio system 122 may further include other items such as an external microphone 144 or other peripheral devices such as a cassette player or video output. The radio system 122 may also include other circuitry such as an amplifier 158 and a plurality of switches 160a-d to interconnect the components. The switches 160a-d are preferably controlled by the audio controller 154. The audio controller 154 will detect and receive signals transmitted from the remote activation device 124 through the antenna 185 and the radio transceiver 182. When the audio controller 154 detects and receives the second signal B from the remote activation device 124, the audio controller 154 will switch, transfer, or route the downlink audio from the device interface 140 to the speakers 146.

Similar to the device shown in FIGS. 1 and 2, the wireless communication device 26 may include a controller 62, a radio transceiver 64, a cellular transceiver 66, a radio interface 38, antennas 68, 69, an internal microphone 42, a speaker 70, and a power supply 72. The wireless communication device 26 may further include other circuitry such as a plurality of switches 74a, 74b for interconnecting the components within the wireless communication device 26. The switches 74a, 74b may be controlled by the controller 62. The wireless communication device 26 receives downlink audio cellular voice communications and transmits uplink audio cellular voice communications via the cellular transceiver 66 and antenna 68.

The controller 62 is configured according to known methods to monitor the cellular transceiver 66 for pending incoming cellular voice communications. Upon receiving a pending voice communication, the controller 62 will notify the operator of a pending voice communication via an audio or other alert. The controller 62 will then determine whether the vehicle operator will agree to accept the voice communication. In one embodiment, the controller 62 may make this determination by waiting for a predetermined time period to detect whether the remote activation device 124 transmitted the first signal A. The controller 62 may receive activation signals A through the antenna 69 and the radio transceiver 64. If the pending incoming voice communication is not accepted, then the controller 62 can do nothing and let the voice communication transfer to an electronic voice answering service. Alternatively, the controller 62 can respond to the voice communication by sending a special message to the incoming caller that the operator of the vehicle is not able to respond to the call at this time.

If the controller 62 determines that the pending incoming voice communication is accepted (a first signal A has been received), then the controller 62 may switch, transfer, or otherwise route the downlink audio of the voice communication from the cellular transceiver 66 to the radio interface 38 so that it can be sent to the radio system 122. In one embodiment, this can be done by the controller 62 through control of a switch 74a that is capable of connecting the cellular transceiver 66 to the radio interface 38. Preferably, the controller 62 has the capability of detecting the presence of a connector in the cradle 180 that is plugged in the radio interface 38. Monitoring connection link 76 may do this. When the controller 62 detects the presence of a connector, and after receiving the activation signal A, the controller 62 may then switch, transfer, or otherwise route the downlink audio of the voice communication to the radio interface 38. When the wireless communication device 26 is not plugged into the cradle 180, the controller 62 may direct that the switch 74a connect the cellular transceiver 66 to the internal speaker 70.

For the uplink audio of the voice communication to be transmitted by the cellular transceiver, several options exist. In one embodiment, the controller 62 senses the presence of a connector in the cradle 180 in the radio interface 38 through link 76. When the controller 62 detects the presence of the connector, and after receiving the activation signal A, the controller 62 may then switch, transfer, or otherwise route the uplink audio of the voice communication from the radio interface 38 to the cellular transceiver 66. In one embodiment, this can be done by the controller 62 through control of the switch 74b that is capable of connecting the radio interface 38 to the cellular transceiver 66. Alternatively, the controller 62 may control the switch 74b so that the cellular transceiver 66 receives uplink audio of the voice communication from the internal microphone 42.

For outgoing communications, the vehicle operator may initiate a cellular voice communication by pressing the switch 128 on the remote activation device 124. As described above, this will do two things. First, the transmitter 130 in the activation device 124 will transmit first signal A to the wireless communication device 26. Since no pending calls are being received, the controller 62 will then activate the telephone so that the vehicle operator may dial a number through the keypad on the wireless communication device 26. If the wireless communication device 26 is configured to accept voice recognition commands, the phone number may be dialed through known voice recognition methods. This can be done by having the vehicle operator speak into the device's internal microphone 42 or an externally wired microphone 144. Second, the transmitter 130 in the remote activation device 124 will transmit a second signal B to the radio system 122. The audio controller 154 will receive the second signal B through the antenna 185 and the radio transceiver 182. The audio controller 154 in the radio system 122 will then direct the radio system 122 to switch, transfer, or otherwise route the downlink audio of the voice communication received from the device interface 140 to the audio speakers 146. This should enable the radio system 122 to receive voice communications from the wireless communication device 26.

In this embodiment, the radio system 122 has a device interface 140 that is capable of receiving the downlink audio of the voice communication through the device interface 140 and over communication cord 136. The audio controller 154 is capable of switching, transferring, or otherwise routing the downlink audio of the voice communication from the device interface 140 to the vehicle audio speakers 146. In one embodiment, the audio controller 154 may do this by control of switch 160c. The audio controller 154 may also be configured to switch off other inputs to the speakers 146 (such as the radio tuner 148 and the CD player 150) by controlling switches 160a and 160b. In one embodiment, the audio controller 154 routes the downlink audio to the audio speakers 146 in response to receiving the second signal B from the remote activation device 124. In another embodiment, the audio controller 154 routes the downlink audio to the audio speakers 146 when sensing the presence of downlink audio being sent by the wireless communication device 26. Monitoring link 178 can do this.

The audio controller 154 may also be configured to control the input of an external microphone 144 that may be used for uplink audio of the voice communication. In one embodiment, the radio system has a switch 160d that is controlled by the audio controller 154. The audio controller 154 may be configured to connect the external microphone 144 to the device interface 140 after detecting the second signal B from the remote activation device 124. This would enable uplink audio to be transferred from the external microphone 144 over device interface 140 to the wireless communication device 26.

Figure 6:
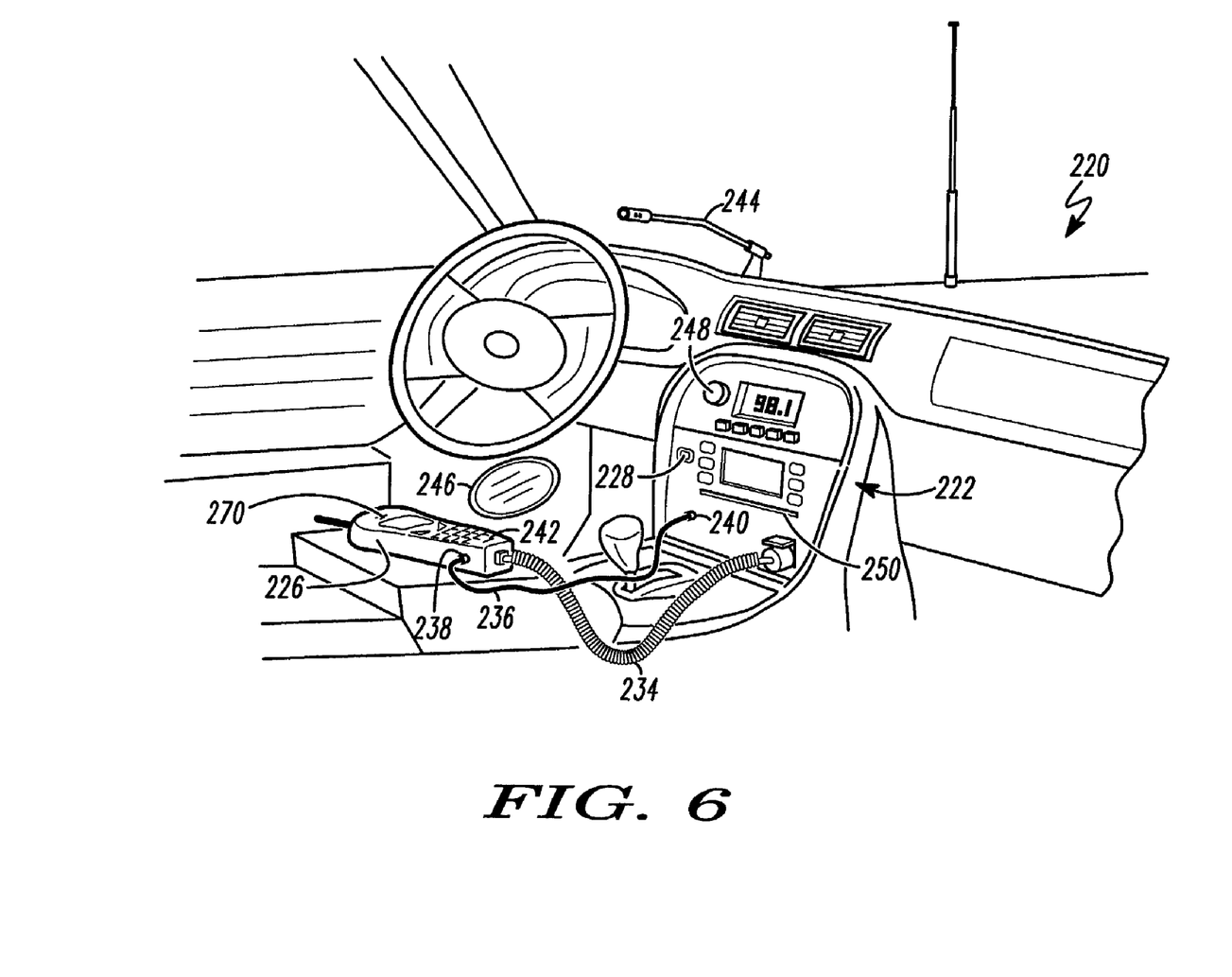
FIG. 6 is a perspective view of another embodiment of an activation system according to the present invention.
Figure 7:
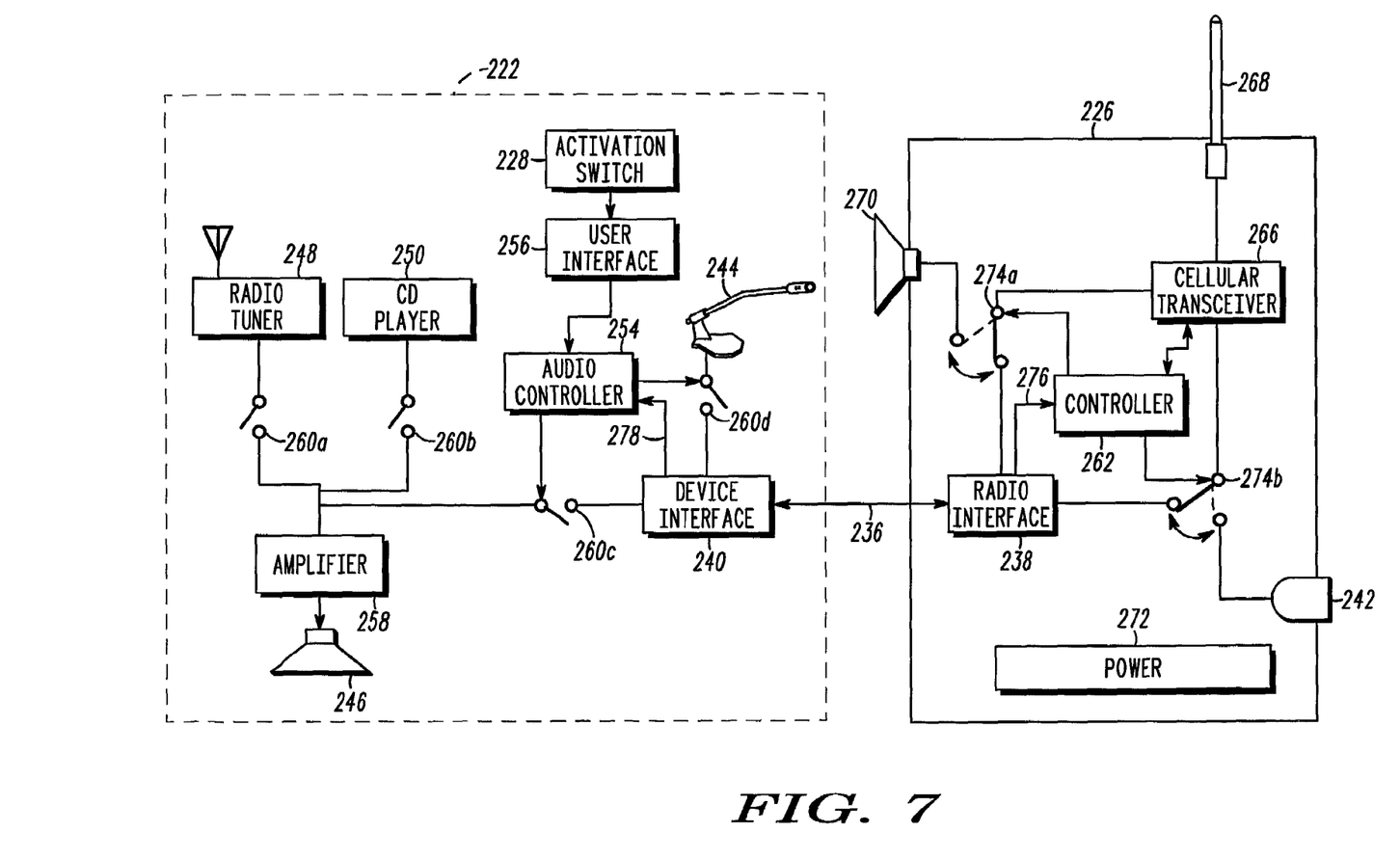
FIG. 7 is a block diagram of another embodiment of an activation system according to the present invention.

FIGS. 6 and 7 illustrate another embodiment of a remote activation system 220 to establish a voice communication through a radio system 222 in a vehicle. Referring initially to FIG. 6, a remote activation system 220 generally includes a switch 228, a wireless communication device 226, and a removable communication cord 236.

In this embodiment, the switch 228 is part of a user interface 256 of the radio system 222. The switch 228 is capable of sending an activation signal through the radio system 222, through the removable communication cord 236, and to the wireless communication device 226. In one embodiment, the activation signal to the wireless communication device 226 is to temporarily ground a transmit, or microphone, line in the removable communication cord 236. The wireless communication device 226 has the capability of detecting the temporary ground in the line and apprises the wireless communication device 226 that the user would like to accept an incoming call or make place a new call. The operator of the vehicle may activate the switch 228 when the operator desires to accept a pending incoming voice communication or to place an outgoing cellular voice communication.

The wireless communication device 226 is preferably a cellular phone that is capable of receiving cellular voice communications. The wireless communication device 226 may be powered by an internal battery or through a DC power cord 234 that is connected to an outlet in the vehicle. As will be explained further below, the wireless communication device 226 is also configured to detect and receive the activation signal from the radio system 222 over the removable communication cord 236. In response to detecting and receiving the activation signal transmitted by the radio system 222, the wireless communication device 226 will send the downlink audio of the cellular voice communication through the removable communication cord 236 via a radio interface 238. The removable communication cord 236 has a connector that plugs into the radio interface 238 and another connector that plugs into a device interface 240 in the radio system 222. The removable communication cord 236 interconnects the wireless communication device 226 to the radio system 222 through the radio interface 238 and the device interface 240, respectively. In the preferred embodiment, the radio interface 238 and the device interface 240 are standard 2.5 mm jack interfaces that are typically known for headsets.

The wireless communication device 226 may also be configured to receive uplink audio of the cellular voice communication from a microphone. The microphone may be an internal microphone 244 in the wireless communication device 226 or may be a separate internal microphone 244 in the vehicle that is wired to the wireless communication device 226 or through the vehicle radio system 222.

The radio system 222 is configured to receive at least downlink audio of the voice communication over the removable communication cord 236 and through the device interface 240. As will be explained in more detail below, the radio system 222 has an audio controller that is capable of switching, transferring, or otherwise routing the downlink audio of the voice communication to speakers 246 in the vehicle. The radio system 222 may further have a radio tuner 248, a CD player 250, and other peripheral input devices that are muted when a voice communication is activated over the radio system 222. Through the use of an external microphone 244, the radio system 222 may also be configured to send uplink audio of the voice communication through device interface 240 and over the removable communication cord 236.

The interaction between the vehicle radio system 222, the activation switch 228, and the wireless communication device 226 will now be explained in the context of FIG. 7. FIG. 7 illustrates a vehicle radio system 222 having a user interface 256 with an activation switch 228. The radio system 222 may generally include an audio controller 254, a radio tuner 248, a CD player 250, a device interface 240, and at least one audio speaker 246. The radio system 222 may further include other items such as an external microphone 244 or other peripheral devices such as a cassette player or video output. The radio system 222 may also include other circuitry such as an amplifier 258 and a plurality of switches 260a-d to interconnect the components. The switches 260a-d are preferable controlled by the audio controller 254.

The switch 228 on the user interface 256 of the radio system 222 is capable of initiating an activation signal to the wireless communication device 226. In one embodiment, the switch 228 sends a signal to the audio controller 254 of the radio system 222. In response to receiving the signal from the switch 228, the audio controller 254 is capable of sending an activation signal to the wireless communication device 226. In one embodiment, the activation signal to the wireless communication device 226 can be done by temporarily grounding the transmit, or microphone, line in the removable communication cord 236. The wireless communication device 226 has the capability of detecting the temporary ground in the line. This apprises the wireless communication device 226 that the user would like to accept an incoming call or make place a new call.

In one embodiment, the wireless communication device 226 is a cellular phone capable of detecting and receiving cellular voice communications and includes a controller 262, a cellular transceiver 266, a radio interface 238, an antenna 268, an internal microphone 242, a speaker 270, and a power supply 272. The wireless communication device 226 may further include other circuitry such as a plurality of switches 274a, 274b for interconnecting the components within the wireless communication device 226. The switches 274a, 274b may be controlled by the controller 262. The wireless communication device 226 receives downlink audio cellular voice communications and transmits uplink audio cellular voice communications via the cellular transceiver 266 and antenna 268.

The controller 262 is configured according to known methods to monitor the cellular transceiver 266 for pending incoming cellular voice communications. Upon receiving a pending voice communication, the controller 262 will notify the operator of a pending voice communication via an audio or other alert. The controller 262 will then determine whether the vehicle operator will agree to accept the voice communication. In one embodiment, the controller 262 may make this determination by waiting for a predetermined time period to detect whether the radio system 222, through audio controller 254, transmits an activation signal. In one embodiment, the activation signal may be temporarily grounding the transmit, or microphone, line in the removable communication cord 236. The wireless communication device 226 has the capability of detecting the temporary ground in the line. If the pending incoming voice communication is not accepted, then the controller 262 can do nothing and let the voice communication transfer to an electronic voice answering service. Alternatively, the controller 262 can respond to the voice communication by sending a special message to the incoming caller that the operator of the vehicle is not able to respond to the call at this time.

If the controller 262 determines that the pending incoming voice communication is accepted (an activation signal has been detected or received), then the controller may switch, transfer or otherwise route the downlink audio of the voice communication from the cellular transceiver 266 to the radio interface 238 so that it can be sent to the radio system 22 over the removable communication cord 236. In one embodiment, this can be done by the controller 262 through control of a switch 274a that is capable of connecting the cellular transceiver 266 to the radio interface 238. Preferably, the controller 262 has the capability of detecting the presence of a connector of the removable communication cord 236 in the radio interface 238 through connection link 276. The connection link 276 may also be used to receive activation signals received from the radio system 222. When the controller 262 detects the presence of a connector, and after receiving the activation signal, the controller 262 may then switch, transfer, or otherwise route the downlink audio of the voice communication to the radio interface 238 and over the removable communication cord 236. During normal phone operations (without going through the radio system 222), the controller 262 may direct that the switch 274a connect the cellular transceiver 266 to the internal speaker 270.

For the uplink audio of the voice communication to be transmitted by the cellular transceiver 266, several options exist. In one embodiment, the controller 262 senses the presence of a connector of the removable communication cord 236 in the radio interface 238 through link 276. The controller 262 may also wait until it receives an activation signal from the radio system 222 through link 276. When the controller 262 detects the presence of the removable communication cord 236, and after receiving the activation signal, the controller 262 may then switch, transfer, or otherwise route the uplink audio of the voice communication from the radio interface 238 to the cellular transceiver 266. In one embodiment, this can be done by the controller 262 through control of a switch 274b that is capable of connecting the radio interface 238 to the cellular transceiver 266. Alternatively, the controller 262 may control the switch 274b so that the cellular transceiver 266 receives the uplink audio of the voice communication from the internal microphone 242.

For outgoing communications, the vehicle operator may initiate a cellular voice communication by pressing the activation switch 228 on the user interface 256 of the vehicle radio system 222. The activation switch 228 will then send a signal to the audio controller 254. As described above, this will do the following things. First, the audio controller 254 will send an activation signal to the wireless communication device 226. Since no pending calls are being received, the controller 262 will then activate the telephone so that the vehicle operator may dial a number through the keypad on the wireless communication device 226. If the wireless communication device 226 is configured to accept voice recognition commands, the phone number may be dialed through known voice recognition methods. This can be done by having the vehicle operator speak into the device's internal microphone 242 or an externally wired microphone 244 in the vehicle. Second, the controller 262 in the wireless communication device 226 will switch, transfer, or otherwise route the downlink audio of the voice communication to the radio interface 238 so that the downlink audio may be sent to the radio system 222 over the removable communication cord 236. This should enable the radio system 222 to receive the downlink audio of the voice communication from the wireless communication device 226. Third, the audio controller 254, at the time of sending the activation signal to the wireless communication device 226, will switch, transfer, or otherwise route the downlink audio from the device interface 240, over the removable communication cord 236, to the audio speakers 246 in the vehicle.

The device interface 240 of the radio system 240 is capable of receiving the downlink audio of the voice communication through the removable communication cord 236. The audio controller 254 is capable of switching, transferring, or otherwise routing the downlink audio of the voice communication from the removable communication cord 236 to the vehicle audio speakers 246. In one embodiment, the audio controller 254 may do this by control of switch 260c. The audio controller 254 may also be configured to switch off or otherwise mute the other inputs to the speakers 246 (such as the radio tuner 248 and the CD player 250) by controlling switches 260a and 260b. In one embodiment, the audio controller 254 routes the downlink audio to the audio speakers 246 in response to receiving the activation signal from the activation switch 228.

The audio controller 254 may also be configured to control the input of an external microphone 244 that may be used for uplink audio of the voice communication. In one embodiment, the radio system 222 has a switch 260d that is controlled by the audio controller 254. The audio controller 254 may be configured to connect the external microphone 244 to the device interface 240 after receiving the activation signal from the switch 228. The external microphone 244 may also be hard-wired directly to the device interface 40 without a switch.

What has been described is an activation system and method for establishing a voice communication in a hands-free cellular communication system. The system and method reduces the complexity and the number of distractions when answering or establishing a cellular communication. The above description of the present invention is intended to be exemplary only and is not intended to limit the scope of any patent issuing from this application. The present invention is intended to be limited only by the scope and spirit of the following claims.

What is claimed is:

1. An activation system for establishing a voice communication through a radio system in a vehicle, the radio system having an audio controller and a device interface, the activation system comprising:
   a switch to send a first activation signal and a second activation signal when a user desires to accept an incoming voice communication, the first activation signal received by the audio controller of the radio system;
   a wireless communication device having a controller, a cellular transceiver, a radio interface, and a means for detecting the second activation signal from the switch, the cellular transceiver for receiving downlink audio of the voice communication; and
   a communication cord interconnecting the device interface of the radio system to the radio interface of the wireless communication device;
   wherein the switch is remote from the wireless communication device and the radio system, the controller in the wireless communication device, in response to detecting the second activation signal from the switch, sends the downlinik audio of the voice communication received by the cellular transceiver to the radio interface for sending to the radio system over the communication cord.

2. An activation system in claim 1 wherein the audio controller in the radio system, in response to receiving the first activation signal from the switch, is capable of sending the downlinik audio of the voice communication from the device interface to at least one speaker in the radio system.

3. An activation system in claim 2 wherein the radio system further includes a microphone that receives uplink audio of the voice communication, the audio controller, in response to receiving the first activation signal from the switch, is further capable of sending the uplink audio of the voice communication to the device interface for sending to the wireless communication device over the communication cord.

4. An activation system in claim 3 wherein the cellular transceiver of the wireless communication device further is capable of transmitting uplink audio of the voice communication, the controller in the wireless communication device, in response to detecting the second activation signal from the radio system, further configures the wireless communication device to receive the uplink audio of the voice communication from the radio interface for transmittal by the cellular transceiver.

5. An activation system in claim 1 wherein the device interface of the radio system and the radio interface of the wireless communication device are 2.5 mm jack interfaces.

6. An activation system in claim 1 wherein the means for detecting the second activation signal in the wireless communication device includes sensing a temporary grounding of a line in the communication cord.

7. An activation system for establishing a voice communication through a radio system in a vehicle, the activation system comprising:
   a remote activation device having a switch and a transmitter, the transmitter responsive to the switch and capable of transmitting a first activation signal and a second activation signal, the remote activation device remote from the radio system and capable of transmitting the first activation signal to the radio system; and
   a wireless communication device having a controller, a radio transceiver, a cellular transceiver, and a radio interface, the controller capable of detecting the second activation signal from the remote activation device through the radio transceiver, the cellular transceiver for receiving downlink audio of the voice communication;
   wherein the controller in the wireless communication device, in response to detecting the second activation signal from the remote activation device, sends the downlink audio of the voice communication received by the cellular transceiver to the radio interface for transmittal to the radio system in the vehicle.

8. The activation system in claim 7, wherein the controller can detect the presence of the radio system when a connector is connected to the radio interface.

9. The activation system in claim 7, wherein the remote activation device is incorporated into a portable electronic device for the vehicle.

10. The activation system in claim 7, wherein the radio system has a device interface and an audio controller, the device interface capable of receiving the downlink audio of the voice communication, the audio controller capable of detecting the first activation signal and routing the downlink audio of the voice communication from the device interface to at least one speaker in the vehicle in response to detecting the first activation signal.

11. The activation system in claim 7, wherein the cellular transceiver is further capable of transmitting uplink audio of the voice communication, the controller in the wireless communication device, in response to detecting the second activation signal from the remote activation device, routes the uplink audio of the voice communication from an external microphone to the cellular transceiver for transmission.

12. A remote activation device for establishing a voice communication for a wireless communication device through a radio system, the remote activation device remote from the wireless communication device and the radio system, the wireless communication device having a controller, a radio transceiver, a cellular transceiver, and a radio interface, the remote activation device comprising:
a transmitter for transmitting a first signal to the controller in the wireless communication device through the radio transceiver and for transmitting a second signal to the radio system through the radio transceiver; and
a switch for activating the transmitter;
wherein the first signal is capable of causing the wireless communication device to accept an incoming voice communication and route the voice communication to the radio interface for transmittal to the radio system in the vehicle
wherein the second signal is capable of causing the radio system to switch an audio input to receive downlink audio of the voice communication from the wireless communication device.

13. The remote activation device in claim 12, wherein the remote activation device is incorporated into a portable electronic device for the vehicle.

14. The remote activation device in claim 12, wherein the radio system has a device interface and an audio controller, the device interface capable of receiving downlink audio of the voice communication, the audio controller capable of detecting the second signal and routing the downlink audio of the voice communication from the device interface to at least one speaker in the vehicle in response to detecting the second signal.

15. A remote activation device for establishing a voice communication for a wireless communication device through a radio system, the remote activation device remote from the wireless communication device and the radio system, the wireless communication device having a radio interface that is interconnected to a device interface in the radio system, the remote activation device comprising:
a switch; and
a transmitter responsive to the switch for transmitting a first signal and a second signal;
wherein the first signal indicates to the wireless communication device to accept an incoming voice communication, and the second signal indicates to the radio system to switch an audio input to receive downlink audio of the voice communication sent over the radio interface and device interface by the wireless communication device.

16. The remote activation device in claim 15, wherein the wireless communication device has a controller, a cellular transceiver, and a radio transceiver, the controller capable of detecting the first signal from the remote activation device through the radio transceiver.

17. The remote activation device in claim 16, wherein the controller in the wireless communication device, in response to detecting the first signal from the remote activation device, sends downlink audio of the voice communication received by the cellular transceiver over a communication cord for transmittal to the radio system, the communication cord connected between the radio interface and the device interface.

18. The remote activation device in claim 15, wherein the radio system has an audio controller and a radio transceiver, the audio controller capable of detecting the second signal from the remote activation device through the radio transceiver.

19. The remote activation device in claim 18, wherein the audio controller in the radio system, in response to detecting the second signal from the remote activation device, switches the audio input to receive the downlink audio from the voice communication sent over a communication cord by the wireless communication device, the communication cord connected between the radio interface and the device interface.

20. A method to activate downlink audio of a voice communication through a radio system in a vehicle, the method comprising the steps of:
notifying the user of a pending incoming voice communication to a wireless communication device;
transmitting a first signal from a remote activation device to the wireless communication device if the pending incoming voice communication is accepted;
transmitting a second signal from the remote activation device to the radio system if the pending incoming voice communication is accepted;
detecting the first signal in the wireless communication device from the remote activation device;
detecting the second signal in the radio system from the remote activation device; sending the downlink audio of the voice communication from the wireless communication device to the radio system through a communication cord after detecting the first signal from the remote activation device; and
switching an audio input to receive the downlink audio of the voice communication from the wireless communication device in response to detecting the second signal.

* * * * *